(12) United States Patent
Ghanem et al.

(10) Patent No.: US 10,717,244 B2
(45) Date of Patent: Jul. 21, 2020

(54) MANUFACTURING CONTROL SYSTEMS AND LOGIC FOR PROGNOSIS OF DEFECTS IN COMPOSITE MATERIALS

(71) Applicants: GM GLOBAL TECHNOLOGY OPERATIONS LLC, Detroit, MI (US); University of Southern California, Los Angeles, CA (US)

(72) Inventors: Roger G. Ghanem, Los Angeles, CA (US); Venkateshwar R. Aitharaju, Troy, MI (US); Hamid G. Kia, Bloomfield Hills, MI (US)

(73) Assignees: GM Global Technology Operations LLC, Detroit, MI (US); University of Southern California, Los Angeles, CA (US)

( * ) Notice: Subject to any disclaimer, the term of this patent is extended or adjusted under 35 U.S.C. 154(b) by 328 days.

(21) Appl. No.: 15/899,412

(22) Filed: Feb. 20, 2018

(65) Prior Publication Data

US 2019/0255787 A1 Aug. 22, 2019

(51) Int. Cl.
*B29C 70/48* (2006.01)
*C08J 5/04* (2006.01)
*B29C 70/54* (2006.01)
*B29C 45/02* (2006.01)
*B29C 70/10* (2006.01)
(Continued)

(52) U.S. Cl.
CPC .......... *B29C 70/48* (2013.01); *B29C 33/0066* (2013.01); *B29C 45/02* (2013.01); *B29C 70/086* (2013.01); *B29C 70/10* (2013.01); *B29C 70/546* (2013.01); *B29C 70/548* (2013.01); *C08G 59/20* (2013.01); *C08J 5/04* (2013.01); *C08J 5/24* (2013.01)

(58) Field of Classification Search
CPC .............................. B29C 70/48; B29C 70/546
See application file for complete search history.

(56) References Cited

U.S. PATENT DOCUMENTS

| 6,532,799 B2 * | 3/2003 | Zhang | B29C 70/48 264/40.1 |
| 6,586,054 B2 * | 7/2003 | Walsh | B29C 70/443 264/101 |

(Continued)

*Primary Examiner* — Benjamin A Schiffman
(74) *Attorney, Agent, or Firm* — Quinn IP Law (57) ABSTRACT

Presented are manufacturing control systems for composite-material structures, methods for assembling/operating such systems, and transfer molding techniques for predicting and ameliorating void conditions in fiber-reinforced polymer panels. A method for forming a composite-material construction includes receiving a start signal indicating a fiber-based preform is inside a mold cavity, and transmitting a command signal to inject pressurized resin into the mold to induce resin flow within the mold cavity and impregnate the fiber-based preform. An electronic controller receives, from a distributed array of sensors attached to the mold, signals indicative of pressure and/or temperature at discrete locations on an interior face of the mold cavity. The controller determines a measurement deviation between a calibrated baseline value and the pressure and/or temperature values for each of the discrete locations. If any one of the respective measurement deviations exceeds a calibrated threshold, a void signal is generated to flag a detected void condition.

20 Claims, 3 Drawing Sheets

(51) Int. Cl.
  *C08G 59/20*  (2006.01)
  *C08J 5/24*  (2006.01)
  *B29C 70/08*  (2006.01)
  *B29C 33/00*  (2006.01)

(56) References Cited

U.S. PATENT DOCUMENTS

| | | |
|---|---|---|
| 7,313,499 B2 * | 12/2007 | Battiste ................. B29C 70/546 |
| | | 374/E1.005 |
| 7,819,462 B1 | 10/2010 | Owens |
| 8,033,592 B2 | 10/2011 | Hsu et al. |
| 8,109,492 B2 | 2/2012 | Winocur |
| 8,481,170 B2 | 7/2013 | Vanimisetti et al. |
| 8,961,724 B2 | 2/2015 | Polewarczyk et al. |
| 9,227,673 B2 | 1/2016 | Berger et al. |
| 9,399,490 B2 | 7/2016 | Aitharaju et al. |
| 9,616,622 B2 * | 4/2017 | Yamamoto .......... B29C 45/1671 |
| 9,650,003 B2 | 5/2017 | Owens et al. |
| 9,715,220 B2 * | 7/2017 | Yao ......................... B29C 70/48 |
| 10,131,099 B2 * | 11/2018 | Harboe ................. B29C 70/443 |
| 10,300,634 B2 * | 5/2019 | Shome ................. B29C 35/0294 |
| 10,429,354 B2 * | 10/2019 | Auffray .................. B29C 70/48 |
| 10,479,034 B2 * | 11/2019 | Hansen .................. B29C 70/48 |
| 2013/0270729 A1 * | 10/2013 | Schibsbye ............. B29C 70/443 |
| | | 264/40.4 |
| 2018/0029316 A1 | 2/2018 | Coppola et al. |
| 2018/0030922 A1 | 2/2018 | Kia et al. |
| 2018/0030923 A1 | 2/2018 | Coppola et al. |
| 2018/0030924 A1 | 2/2018 | Coppola et al. |
| 2018/0031027 A1 | 2/2018 | Coppola et al. |
| 2018/0319107 A1 * | 11/2018 | Yao .......................... B29C 70/54 |
| 2019/0152169 A1 * | 5/2019 | Volpato .................. B29C 45/02 |

\* cited by examiner

FIG. 5

MANUFACTURING CONTROL SYSTEMS AND LOGIC FOR PROGNOSIS OF DEFECTS IN COMPOSITE MATERIALS

STATEMENT REGARDING FEDERALLY SPONSORED RESEARCH AND DEVELOPMENT

This invention was made with government support under Contract No. DE-EE0006826 awarded by the U.S. Department of Energy (DOE). The government has certain rights in the invention.

INTRODUCTION

The present disclosure relates generally to the manufacture of composite-material constructions. More specifically, aspects of this disclosure relate to systems, methods, and devices for predicting and preempting defects within transfer-molded, fiber-reinforced polymer composite panels.

Composite materials are used for manufacturing a vast array of modern products. Many current-production automobiles, watercraft, and aircraft, for example, are originally equipped with load-bearing body panels, aesthetic trim panels, support frame members, as well as various other components that are manufactured, in whole or in part, from composite materials. Fiber-reinforced plastic (FRP) is one example of composite material that is used in mass-production manufacturing applications, favored for its high strength-to-weight ratio, increased elasticity, and light weight properties. FRP's are typically formed by suspending a high-tensile-strength fibrous material, such as glass, carbon, aramid or basalt fibers, within a solidified polymer, such as an epoxy/resin matrix.

An available technique for fabricating fiber-reinforced plastic composite constructions is resin transfer molding (RTM). Many RTM processes use a hydrostatic injection system to introduce high-pressure, low-viscosity resin into a closed mold. Dry fibers, which may be in the form of a prefabricated fiber mat (or "preform"), are placed within the interior of the mold prior to introduction of the resin. Sufficient resin is injected to fill the interior of the mold and impregnate the fiber preform. The mold may be heated and placed under vacuum, as in vacuum assisted resin transfer molding (VARTM), to assist with resin flow. The temperature of the mold is then elevated to cure the resin before removing the part from the RTM apparatus. RTM processes offer the economical production of composite parts with high strength characteristics, tight dimensional tolerances, complex geometries, and consistent part quality.

SUMMARY

Disclosed herein are manufacturing control systems for predicting defects in composite-material constructions, methods for making and methods for using such manufacturing control systems, and resin transfer molding techniques for predicting and ameliorating void conditions in fiber-reinforced polymer panels using sensor reading for characteristic data on the inside face of the mold. By way of example, there are presented algorithms for inferring a void condition and air entrapment within an FRP panel during an RTM process, including features for preempting and for ameliorating such void conditions. Manufacturing process control may use closed-loop sensor feedback to modulate activation of actuators installed on the mold for void condition reduction. In addition, to help preclude air trapping due to changes in local permeability that may cause race-tracking, electromechanical vents are strategically located at calibrated positions on the flow front and controlled based on real-time feedback of the algorithms.

In accord with aspects of the disclosed concepts, variations in resin infusion behavior may be identified by observing pressure measurements and temperature measurements at different sensor locations within the mold, and comparing these sensor measurements with calibrated pressure and temperature baselines. Deviations of pressure and temperature sensor readings outside designated threshold ranges provide evidence of possible void formation (e.g., verified both experimentally and numerically). On-line, real-time monitoring of pressure and temperature at designated sensor locations, and comparing sensor measurements with a pre-calculated database, enables the prognosis of void formation. Foreseeing a void may be accompanied with algorithms that identify the expected location of the void and automatically open a vent near the expected location to remedy the void formation.

Attendant benefits for at least some of the disclosed concepts include early identification of defects, accompanied with expedited implementation of corrective measures, at the manufacturing stage of a composite-material construction. Disclosed manufacturing control systems help to identify defects with greater assurance and, thus, minimize or otherwise eliminate the release of defective panels. In addition to identifying defects, disclosed techniques also help to preempt the occurrence of defects (void formation) and, thus, curtail the overall number of defective parts. Additional benefits may include a reduction in scrap complemented with a concomitant reduction of material costs. Disclosed techniques help to mitigate any endemic uncertainty in the manufacture of composite-material constructions that is oftentimes caused by variations in raw materials, unavoidable race tracking (e.g., resulting from preform misplacement or disparities in resin viscosity), and incongruences in processing conditions.

Aspects of the present disclosure are directed to transfer molding processes with quality control features for detection and prognosis of defects in fiber-reinforced polymer panels. For instance, a method is presented for forming a composite-material construction using a molding system. The molding system is equipped with a generally hollow, closed mold that is fluidly coupled, e.g., at one end thereof, to a primary gate and fluidly coupled, e.g., at an opposite end thereof, to a primary vent for injecting and evacuating resin, respectively. This representative method includes, in any order and in any combination with any of the disclosed features and options: receiving, via a resident or remote electronic controller that is communicatively connected to the molding system, a start signal that generally indicates a fiber-based preform is positioned inside the mold cavity; and, transmitting, via the electronic controller to the molding system, a command signal to inject pressurized resin into the mold cavity through the primary gate to induce resin flow within the mold cavity and thereby impregnate the fiber-based preform.

During the resin injection process, the electronic controller: receives (e.g., in real-time) from a distributed array of pressure and/or temperature sensors attached to the mold, sensor signals indicative of pressure and/or temperature at discrete locations along an interior face of the mold cavity; and, determines a respective measurement deviation between a calibrated baseline value and the pressure and/or temperature values for each discrete location. In response to any one of the measurement deviations exceeding a calibrated threshold, the electronic controller generates a void signal that indicates detection of a void condition. Deviation in measured pressure and/or temperature at strategic locations is related to a baseline value and, using a pre-computed off-line database, void state of the composite-material construction may be predicted using any one of at least the following three algorithms: inverse analysis to estimate probability density of permeability, joint probability density function of void indicators, and stochastic simulations using polynomial chaos expansions.

Other aspects of the present disclosure are directed to manufacturing control systems for the detection and prognosis of defects in fiber-reinforced polymer panels. As an example, a resin transfer molding system for forming a composite-material construction is presented. The resin transfer molding system includes a hydrostatic molding system with a closed mold that is generally hollow, a primary gate through which resin is introduced into the mold cavity, and a primary vent through which resin is evacuated from the mold cavity. A distributed array of sensors is mounted to the mold, with each sensor being individually operable to monitor pressure and/or temperature at a discrete location and output one or more signals indicative thereof. An electronic controller, which may be resident to or remote from the molding system, is communicatively connected to the sensor array and molding system, and is programmed to effect processor-executable instructions stored in a main, auxiliary or remote memory device. The molding system may also be equipped with a series of secondary vents strategically placed around the mold (e.g., spaced equidistantly along an outer perimeter of the mating mold segments), and individually actuable to vent resin/air from the mold.

The programmable electronic controller receives a start signal that generally indicates a fiber-based preform has been placed in the mold cavity. Once the preform is properly placed, the electronic controller transmits a command signal to the molding system to inject pressurized resin into the mold cavity, via the primary gate, to induce resin flow within the mold cavity and thereby impregnate the fiber-based preform. During resin injection, the controller receives sensor signals from the distributed sensor array that indicate respective pressure and/or temperature at discrete locations on an interior face of the mold cavity. For each discrete location of the mold cavity, the electronic controller determines a respective measurement deviation between a calibrated baseline value and the corresponding pressure and/or temperature values. In response to any one of the measurement deviations exceeding a calibrated threshold, the electronic controller automatically: outputs a void signal indicative of a detected void condition, and transmits a command signal to open one or more secondary vents, each of which is proximate a discrete location that corresponds to the pressure and/or temperature sensor readings associated with a measurement deviation that exceeds the calibrated threshold.

Additional aspects of the present disclosure are directed to methods for assembling and methods for operating any of the disclosed manufacturing control systems. Aspects of the present disclosure are also directed to fiber-reinforced polymer structures formed from any of the disclosed methods. Also presented herein are non-transitory, computer readable media storing instructions executable by at least one of one or more processors of one or more molding system controllers, integrated circuit devices, or dedicated control modules, to carry out any of the disclosed methods, techniques and algorithms.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the words "any" and "all" shall both mean "any and all"; and the words "including" and "comprising" and "having" shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example.

Figure 1:
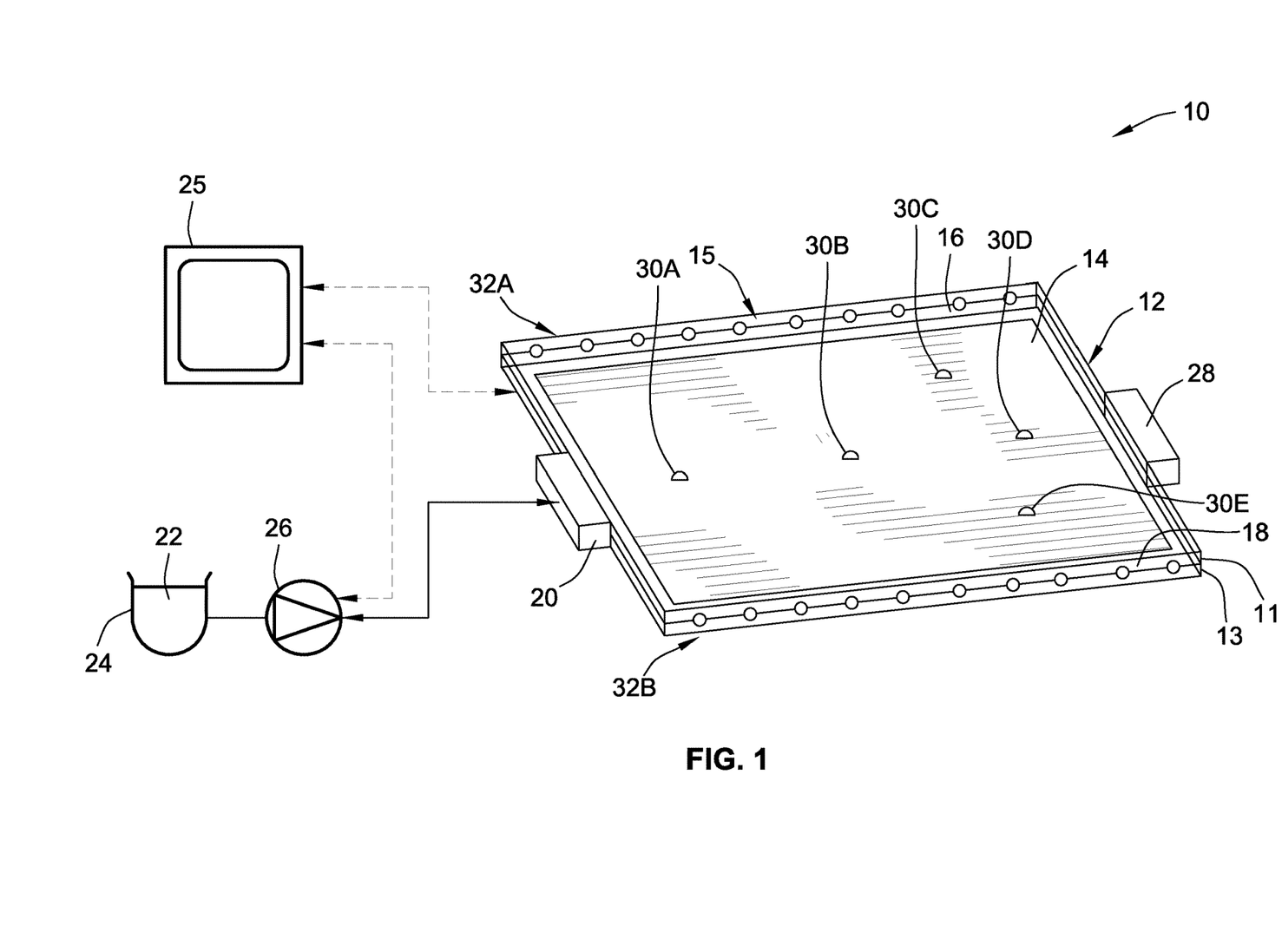
FIG. 1 is a schematic illustration of a representative resin transfer molding (RTM) system for manufacturing fiber-reinforced polymer composite constructions in accordance with aspects of the present disclosure.

Referring now to the drawings, wherein like reference numbers refer to like features throughout the several views, there is shown in FIG. 1 a representative composite-material manufacturing system, which is designated generally at 10 and portrayed herein for purposes of discussion as a controller-automated resin transfer molding (RTM) apparatus. The illustrated composite-material manufacturing system 10—also referred to herein as "manufacturing system" or "RTM system" for short—is merely an exemplary application with which novel aspects and features of this disclosure may be practiced. In the same vein, implementation of the present concepts for fabricating carbon-fiber-reinforced resin-based polymer constructions should also be appreciated as a representative application of the novel aspects and features disclosed herein. As such, it will be understood that aspects and features of this disclosure may be implemented for manufacturing other composite-material constructions, and may be integrated into any logically relevant type of transfer molding architecture. Moreover, only select components of the RTM system 10 have been shown by way of example in the drawings and will be described in detail herein. Nevertheless, the RTM system 10 of FIG. 1 can include numerous additional and alternative features, as well as other available and hereinafter developed peripheral components, without departing from the intended scope of this disclosure. Lastly, the drawings presented herein are not necessarily to scale and are provided purely for instructional purposes. Thus, the specific and relative dimensions shown in the drawings are not to be construed as limiting.

RTM system 10 of FIG. 1 may employ a hydrostatic, thermoset-curing, liquid-composite molding apparatus as represented by a closed mold 12 fashioned as a bipartite construction with a first (upper) mold segment 11 that sealingly mates with a complementary second (lower) mold segment 13 to define therebetween a sealable chamber or "mold cavity." In contrast to open mold configurations, which are typically open to the atmosphere during injection and curing, a "closed mold" may be typified by an enclosed mold cavity with a gating system of fluid passages that regulate the introduction of a pressurized casting polymer into the mold. A fiber-based preform 14 of any desired shape and material, such as a carbon-fiber mat or glass-fiber roving, sits within a mold cavity 15 on an upper surface of the lower mold segment 13, also referred to as the "tool surface" of the mold 12. Seal/index pins (not shown) in complementary recesses in the upper and/or lower mold segments 11, 13 may be used to accurately position the fiber-based preform 14 in the mold cavity 15. At least some applications may require the fiber-based preform 14 be laid-up by hand on lower mold portion 13 of mold 12; other system architectures may automate this and any other stage of the RTM process using a programmable electronic controller 25 (also referred to herein as "RTM system controller"). The reinforcing fibers used to prefabricate the fiber-based preform 14 may be composed of any suitable materials used as reinforcing fibers, such as carbon fibers, glass fibers, aramid fibers, boron fibers, metal fibers, and any combination thereof. For other optional configurations, at least one of the mold segments 11, 13 may be equipped with a flexible vacuum bag, e.g., made of silicone rubber or other suitable flexible material, to accommodate a vacuum assisted resin transfer molding process.

In accord with the illustrated example, one or both mold segments 11, 13 may be formed or machined with resin grooves, channels or other fluid conduits 16 and 18 generally defined between the inner surface of the mold 12 and the fiber-based preform 14. Each resin channel 16, 18 is fluidly coupled to one or more resin inlet ports, represented herein by a primary gate 20, through which a curable polymer casting agent is introduced into the mold cavity 15. This curable polymer may take on any suitable form, including liquid thermoset resins ordinarily used in the production of transfer molded articles. Some specific, yet non-limiting examples of thermosetting resins include epoxy resin, phenolic resin, melamine resin, unsaturated polyester resin, polyurethane resin, maleimide resin, silicone resin, cyanic acid ester resin, vinyl ester resin, as well as hybrids, combinations and modifications thereof. Once the fiber-based preform 14 is laid up on the lower mold segment 13, the upper mold segment 11 is then closed and sealed with lower segment 13, e.g., via a clamp (not shown). Liquid resin 22 is pulled from a resin supply 24 and injected into the mold cavity 15 through primary gate 20 via resin pump 26, the operation of which is governed by the electronic controller 25. When the mold cavity 15 is substantially filled and, thus, the fiber-based preform 14 is saturated with resin 22, excess resin and entrapped air is evacuated through a primary vent 28. It will be readily recognized that alternative means may be employed to impregnate the fiber-based preform 14 with resin 22, including vacuum pressure, piston-based injection, autoclave, and other conventional mechanisms for generating pressure.

Throughout the RTM process, pressure and/or temperature fluctuations occurring inside the mold cavity 15 are advantageously detected by a distributed array of pressure and/or temperature sensors, represented in FIG. 1 by five discrete sensors 30A, 30B, 30C, 30D and 30E. Each of these sensors 30A-30E is operatively attached to the mold 12, either completely integrated into one of the mold segments 11, 13 or, alternatively, situated with a main sensor body mounted outside of the mold 12 and a linked sensing element mounted to one of the mold segments 11, 13. Real-time, online sensor data of temperature/pressure at various discrete locations within the mold cavity 15 is measured by the sensors 30A-30E and transmitted to the electronic controller 25 at any juncture during the RTM process. It should be appreciated that the number, locations, and configurations of the distributed array of sensors 30A-30E may be varied, for example, to accommodate the design requirements and quality control restrictions of an intended application. Other optional hardware may include a first series of individually operable secondary vents (collectively designated as 32A) equidistantly spaced along a left flank of the mold 12, and a second series of individually operable secondary vents (collectively designated as 32B) equidistantly spaced along a right flank of the mold 12.

As indicated above, the electronic controller 25 is constructed and programmed to govern, among other things, various stages of the RTM process, including operation of the primary gate 20 and vent 28, the pump 26, and the two series of secondary vents 32A, 32B. Control module, module, controller, control unit, electronic control unit, processor, and any permutations thereof may be used interchangeably and may be defined to mean any one of various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both, executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets, including calibrations and look-up tables. A controller may be designed with a set of control routines executed to provide any of the disclosed functions and operations. Control routines are executed, such as by a central processing unit, and may be operable to monitor inputs from sensing devices and other networked control modules, and then may execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing use or operation. Alternatively, routines may be executed in response to occurrence of a designated event or list of designated events during operation of the system 10.

Figure 2:
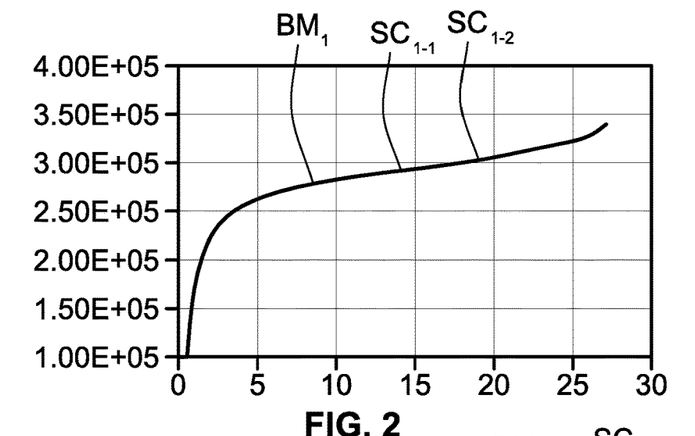
FIG. 2 is a graphical illustration of pressure versus time for a representative first (gate) sensor proximate the primary resin gate of the RTM system of FIG. 1.
Figure 3:
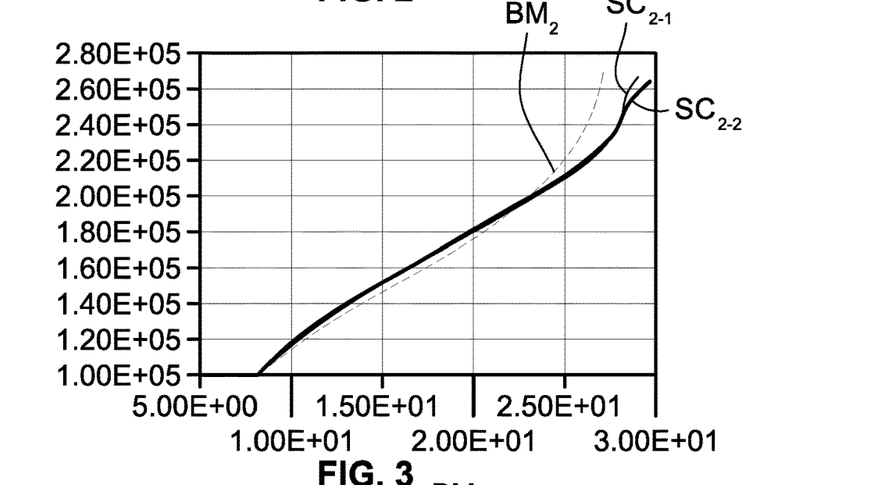
FIG. 3 is a graphical illustration of pressure versus time for a representative second (central) sensor midway between the primary resin gate and the primary resin vent of the RTM system of FIG. 1.
Figure 4:
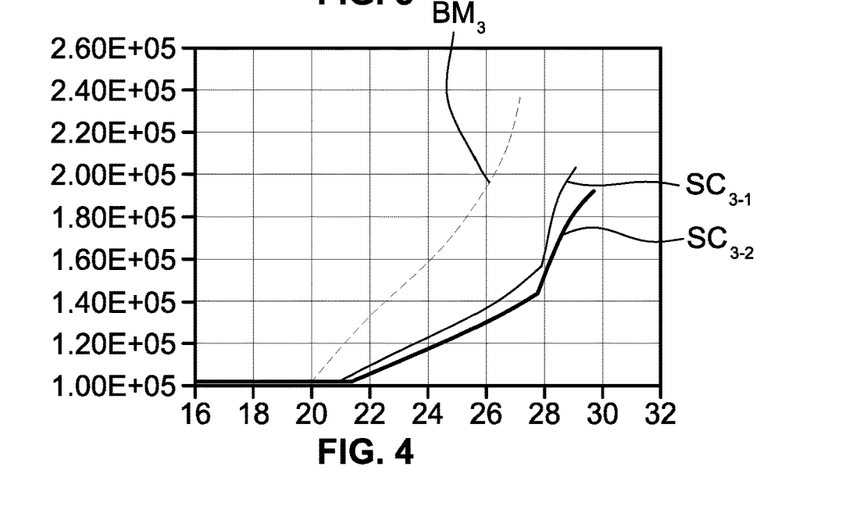
FIG. 4 is a graphical illustration of pressure versus time for a representative third (vent) sensor proximate the primary resin vent of the RTM system of FIG. 1.

FIGS. 2-4 graphically illustrate time-based pressure readings taken by three separate sensors at discrete locations within the closed mold 12 of the RTM system 10 presented in FIG. 1. By way of example, and not limitation, FIG. 2 juxtaposes a first baseline sensor model $BM_1$ with first and second sensor 1 cases $SC_{1-1}$ and $SC_{1-2}$ for the first sensor 30A. As shown in the drawings, first sensor 30A is the closest of the distributed sensor array to the primary gate 20 of the RTM system 10. In this instance, the first and second sensor 1 cases $SC_{1-1}$, $SC_{1-2}$ overlap almost identically with the first baseline sensor model $BM_1$; this indicates that the working pressure inside the mold cavity 15 proximate the primary gate 20 is behaving as expected (i.e., generally unaffected by variations in resin infusion behavior. Contrastingly, FIG. 3 juxtaposes a second baseline sensor model $BM_2$ with first and second sensor 2 cases $SC_{2-1}$ and $SC_{2-2}$ for the second sensor 30B, which is generally interposed halfway between the primary gate 20 and vent 28 of FIG. 1. The slight deviation between the second baseline sensor model $BM_2$ and the two sensor 2 cases $SC_{2-1}$ and $SC_{2-2}$ indicates that the rate of increase in working pressure at this location begins to diverge at higher pressure levels, e.g., as race-tracking within the mold 12 becomes more prevalent. FIG. 4, by comparison, juxtaposes a third baseline sensor model $BM_3$ with first and second sensor 3 cases $SC_{3-1}$ and $SC_{3-2}$ for the sensor 30D that is closest to the primary vent 28 of the RTM system 10. Differences in race-tracking, e.g., caused by improper placement of the fiber-based preform 14, become most readily apparent from the significant deviation of the sensor 3 cases $SC_{3-1}$ and $SC_{3-2}$ from the corresponding baseline sensor model $BM_3$.

Figure 5:
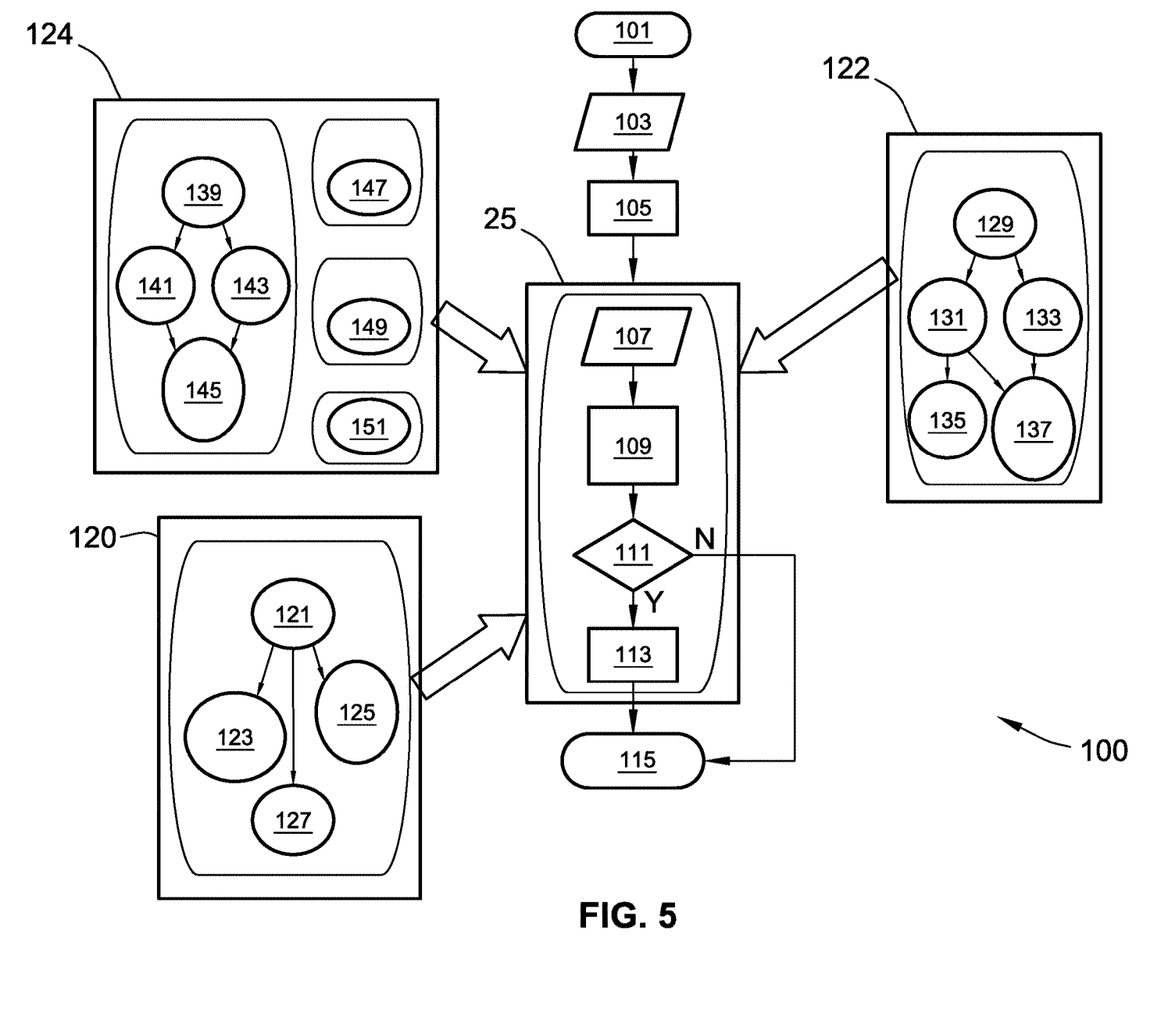
FIG. 5 is a flowchart illustrating a representative model-based, multivariable control algorithm for governing operation of a resin transfer molding system that may correspond to instructions executed by control-logic circuitry, programmable electronic controller, or other computer-based device in accordance with aspects of the disclosed concepts.

With reference now to the flow chart of FIG. 5, an improved method or control strategy for governing operation of a molding system, such as any of the hardware illustrated in FIG. 1, for manufacturing a composite-material construction, such as the fiber-reinforced resin-based polymer panel discussed above, is generally described at 100 in accordance with aspects of the present disclosure. Some or all of the operations illustrated in FIG. 5 and described in further detail below may be representative of an algorithm that corresponds to processor-executable instructions that may be stored, for example, in main or auxiliary or remote memory, and executed, for example, by an onboard or remote controller, central processing unit (CPU), control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 with processor-executable instructions for a dedicated programmable controller, such as RTM system controller 25 of FIG. 1, to call up an initialization procedure for a protocol to monitor and regulate the forming of a composite-material construction using a molding apparatus. With continuing reference to the architecture of FIG. 1 as a representative implementation of the methodology set forth in FIG. 5, the controller 25 may be operable to receive, process and synthesize pertinent information and inputs, and execute control logic and algorithms to regulate various RTM system 10 components and attendant operations to achieve desired control targets and outputs. RTM system controller 25 may be programmed with algorithms for predicting and controlling the manufacture of composite materials. These algorithms may be used to infer a void condition within fiber-reinforced polymer panel during a resin transfer molding process, and to pre-empt any such void formation.

Prior to, contemporaneous with, or after executing the operation or operations associated with terminal block 101, method 100 of FIG. 5 initiates input/output block 103 to receive data and other information pertinent to operation of the RTM system 10 of FIG. 1. By way of non-limiting example, the RTM system controller 25 receives an electronic (start) signal, e.g., from a system operator's graphical user interface (GUI), a capacitive or inductive proximity sensor within the mold cavity 15, or as part of a general control sequence for automated manufacture of composite-material parts, that indicates a fiber-based preform 14 is placed within the mold cavity 15 and properly aligned with respect to the upper and lower mold segments 11, 13. Responsive to this start signal, the controller 25 executes process block 105 and transmits a command signal, e.g., to the resin pump 26 of FIG. 1, to begin injecting pressurized resin 22 into the mold cavity 15 through the primary gate 20. In so doing, a resin flow rate is induced within the mold cavity 15; the continued flow of pressurized resin 22 will impregnate the fiber-based preform 14. If no defects are detected or otherwise anticipated, as described above and below, resin injection is temporarily halted and the resin-impregnated fiber-based preform 14 is cured, e.g., via a command signal from the controller 25 to a system heating element (not shown) to elevate mold temperature past a calibrated thermoset (glass-transition) temperature. If desired, curing may be assisted via introduction of a catalyst or other curing agent, and/or by elevating pressure within the mold cavity 15. After molding and cure of the injected resin, a command signal is sent, e.g., to the primary vent 28, to evacuate resin 22 from the mold cavity 15, and the molded part is removed from the mold 12.

During the resin injection process, deviations in sensor pressure/temperature readings, e.g., resulting from raw material variations, race-tracking, and inconsistent processing conditions, may offer evidence about the probability of part defects. On-line monitoring and closed-loop feedback of pressure and/or temperature at multiple discrete locations within the mold cavity, and comparing these measurements with a pre-calculated database, helps to enable the detection and prognosis of void formation. In this regard, input/output block 107 may comprise instructions for the electronic controller 25 to communicate with the distributed array of sensors 30A-30E and receive therefrom sensor signals indicative of respective pressure and/or temperature values at discrete locations on the interior face of the mold 12 within the mold cavity 15. It is desirable, for at least some system configuration, that each sensor be strategically placed, e.g., based on apriori data, at locations within the mold cavity 15 that have been established to provide measurements statistically shown to provide credible evidence of void formation.

At process block 109, the RTM system controller 25 identifies, calculates, or computes (referred to interchangeably and collectively as "determines") a respective measurement deviation between a corresponding calibrated baseline value and the pressure and/or temperature values for each of these discrete mold cavity locations. At the same time, the controller 25 communicates with any one of multiple pre-computed offline databases 120, 122 and 124, each of which will be individually described in extensive detail below, to retrieve stochastic simulation model data from which void state may be predicted. Concomitantly, decision block 111 of method 100 provides processor-executable instructions for the RTM system controller 25 to determine if any one of the measurement deviations determined at process block 109 exceeds a calibrated threshold. If not (Block 111=NO), method 100 may terminate at terminal block 115 or may optionally loop back to input/output block 107. Conversely, in response to a measurement deviation exceeding a calibrated threshold probability (Block 111=YES), the RTM system controller 25 may automatically respond at process block 113 by generating and/or outputting a void signal indicative of a detected void condition. Process block 113 may also include transmitting a command signal or sequence of modulated command signals to open one or more of the secondary vent 32A, 32B. Each activated secondary vent 32A, 32B will be proximate a discrete location or locations that correspond to pressure/temperature values associated with a measurement deviation that exceeds the calibrated threshold probability. Method 100 thereafter terminates at terminal block 115; optionally, the method 100 may return to terminal block 101, e.g., such that method 100 runs in a continuous loop.

An underlying concept that may be integrated into the method 100 is to relate a deviation in measured pressures/temperatures at strategic mold locations from a baseline and, using model data extracted from an offline database, predict a void state of a transfer-molded, fiber-reinforced polymer part using the techniques presented herein. If an algorithm predicts a void or a dry area, corrective remedial actions may be applied to a mold. In a first approach, which is represented by a first (Inverse Analysis Stochastic Simulation) offline database 120 of FIG. 5, an inverse analysis is carried out to investigate an inverse problem and thereby infer, as random variables, a permeability of fibers in an FRP-based part and a permeability of race-tracking in resin channels (e.g., the channels/gaps 16 and 18 between the fiber-based preform 14 and the interior surface of the mold 12). An inverse analysis may be carried out with a statistical prior model that is pre-computed offline from numerical simulations. A statistical prior model may be typified as a model that sufficiently encapsulate expert analysis, and may be represented using a Beta distribution over a plausible range of values for permeabilities. The prior model may be used within an inverse analysis (e.g., a Bayesian statistical procedure) to obtain posterior probabilities of permeabilities (or "computed permeabilities").

Once the fiber and race-tracking permeabilities have been computed, a forward model—the reverse of an inverse model—may be used to estimate one or more void indicators. A forward model (or "dynamics predictor") is a model that encapsulates the known physics for a given problem, starting with causational parameters to ascertain an expected outcome. For some application, forward modeling may be too costly for evaluation in a real-time setting. Offering improved efficiency, a reduced model may be used as a representation of the forward model, designed to serve a very specific purpose. If the probability of void formation, deduced from these indicators is too high, the panel may be designated as defective.

With continuing reference to the method 100 of FIG. 5, the first (Inverse Analysis Stochastic Simulation) offline database 120 begins at operation 121 with completing a stochastic simulation using a credible procedure to compute one or more prior probability models. Two representative examples of "credible procedures" that may be used include a Monte Carlo sampling using Latin Hypercube Sampling, and a sampling using Polynomial Chaos Surrogates. At operation 123, the offline database 120 computes, carries out, or otherwise executes an inverse analysis to estimate a probability density of permeability of fibers in the fiber-based preform and/or a probability density of permeability of race-tracking in the gaps/channels between the fiber-based preform and the mold cavity. Operation 125 includes computing a joint density function of a vector of sensor pressures and permeability. In addition, operation 127 may then compute a reduced model of void indices as a function of the probability density of permeability of the fibers and/or the probability density of permeability of race-tracking, e.g., using a polynomial chaos expansion (PCE) formalism.

If the method 100 employs the stochastic-simulation based prior probability models of the first pre-computed offline database 120, the inferred permeabilities of the fibers and race-tracking channels (operation 121), as well as the computed joint density function (operation 125) and computed reduced model of void indices (operation 127) may be extracted by the RTM system controller 25, e.g., at input/output block 107. The measurement deviation determinations conducted at operation block 109 may include updating a probability model of permeability that governs sensor data to obtain a posterior distribution. The posterior distribution may be designated as a fusion of prior expert analysis and evidence obtained from data, e.g., using Bayesian updating. Decision block 111 of FIG. 5 may then require sampling a permeability from the posterior distribution and then evaluating a probability of the void indices using the reduced model. From this information, the RTM system controller 25 may determine if a threshold probability is exceeded and, thus, corrective action is warranted.

According to a second technique, which is represented by a second (Joint Probability Density Function) offline database 122 of FIG. 5, a joint statistical characterization of void indicators and detected data is synthesized from a combination of experimental data and numerically simulated data. This joint characterization may be in the form of a joint probability density function or distribution function (JPDF). Once a JPDF has been constructed, a distribution of the voids, conditional on the observed detected data, may be estimated using numerical integration. The time variation of the detected data may be treated by replacing the time function from a discrete approximation, such as a polynomial expansion of Fourier Expansion, and performing conditioning on the thus obtained vector-valued data. A training set that may generally consist of simulation results or experimental results may be used to construct an estimate of the joint density function $f_{V,P}(v,p)$ of detected data (discretized over time) and void indicators (also discretized over time). From this, the marginal density function $f_P(p)$ of sensor pressures may be computed by integration. During operation, once a specific set of pressures is observed, a probability of void indicators $\beta_{V|P}(v)$, which may be conditional on those detected data values, may be computed as:

$$f_{V|P}(v) = f_{V,P}(v,p)/f_P(p)$$

Second offline database 122 of FIG. 5 may begin at operation 129 with completing a stochastic simulation using a credible procedure to compute one or more prior probability models. For at least some applications, operation 129 may be substantially identical to operation 121. Operations 131 and 133 respectively include the database 122 discretizing pressure sensor signals over time and discretizing computed void indices over time. The void indices of operation 133 may be computed in the same manner as in operation 127 of the first offline database 120; another option would be to use experimental measurements to construct the joint probability densities. Pressure signals and void indicators may be discretized over time by replacing each corresponding time record with a set of discrete numerical values, e.g., as follows: numerical values are obtained as coefficients in an expansion of the signal. Valid expansions may include, as some non-limiting examples, Fourier series, Chebyshev polynomial expansions, wavelet expansions, etc. At operation 135, the second offline database 122 computes a density function based on the time-based discretization of the sensor signals. In addition, operation 137 computes a joint density function of a vector of void indices discretized over time and a vector of the sensor signals indicative of respective pressure and/or temperature values. The joint density function for the vector of sensor pressures may be computed in a number of ways, e.g., generally based on standards set forth in statistical literature. A desired approach may include constructing a non-parametric model using Kernel Density Estimates (KDE) or radial basis functions (RBF), both of which are suitable for high-dimensional probability estimation. Similar procedures may be used for determining the joint density function in operations 125 and 137.

If the method 100 employs the stochastic-simulation based JPDF of void indicators as provided by the second pre-computed offline database 122, the time-based discretized pressure sensor signals (operation 131) and time-based discretized void indices (133), as well as the computed density function (operation 135) and vector-based joint density function (operation 137) may be extracted by the RTM system controller 25, e.g., at input/output block 107. The measurement deviation determinations conducted at operation block 109 may correspondingly include computing a probability of pressure and/or temperature values based on the computed density function of pressures. The probability of pressures may be computed from the joint probability of pressure/voids by summing over all events including voids. That is, the denominator may be obtained by integrating the numerator with respect to v. Decision block 111 of FIG. 5 may then require computing a conditional probability of the void indices given the pressure and/or temperature values. After computing the joint density functions of pressure and voids, and a marginal density function of pressures (e.g., by integration as described above), a conditional probability density function may be obtained by dividing the joint function by the marginal function. From this information, the RTM system controller 25 may determine if a threshold probability is exceeded and, thus, corrective action is warranted.

A third approach to identifying and examining void indicators, which is represented by a third (PCE Stochastic Simulation) offline database 124 of FIG. 5, may rely on representations, such as polynomial chaos expansions, including more general representations based on white noise calculus or response surface representations in terms of independent random variables. In particular, changes in void indicators may be expressed as a function of changes in detected data measurements using directional derivatives. These sensitivities depend on precomputed coefficients in approximations of detected data at sensor locations and void indicators.

Continuing with the above discussion, the third offline database 124 of FIG. 5 may begin at operation 139 by completing a stochastic simulation according to a PCE formalism. The PCE solution may generally include expanding the solution with respect to a polynomial in random variables, and then evaluating the coefficients in this expansion using numerical quadrature. Operations 141 and 143 respectively include identifying and storing time-based PCE coefficients for pressure sensor location and time-based PCE coefficients for void indicators. At operation 145, database 124 computes a sensitivity of the void indicators with respect to the discrete sensor locations as a function of time. The "sensitivity" of a set of void indicators with respect to pressure sensors as a function of time may be computed by, first, computing the coefficients in the PCE expansion for voids and pressures. An estimation formula utilizes these coefficients to approximate the associated sensitivities. Operation 147 includes computing a first baseline value with no race-tracking, while operation 149 includes computing a second baseline value with race-tracking and no voids. Deterministic baselines may be associated with manufacturing scenarios where no voids and no damage are observed. At operation 151, a critical tolerable void index is identified.

If the method 100 employs the PCE Stochastic Simulation provided by the third pre-computed offline database 124, the computed time-based sensitivity of the void indicators (operation 145), the first and second baseline value (operations 147 and 149), and the critical tolerable void index (operation 151) may be extracted by the RTM system controller 25, e.g., at input/output block 107. The measurement deviation determinations conducted at operation block 109 may correspondingly include calculating a first difference between sensor signals indicative of respective pressures at the discrete locations and a nominal pressure using the first baseline value, and determining a second difference between sensor signals indicative of respective pressures at the discrete locations and a nominal pressure using the second baseline value. Decision block 111 of FIG. 5 may then require decision pooling, e.g., to compute a probability of void formation. Each information stream feeding into the "decision pooling" operation may have its own probabilistic characterization; as such, standard probability theory (e.g., the total probability theorem and Bayes theorem) is used to carry out decision pooling. Using this information, the RTM system controller 25 may then determine if a threshold probability is exceeded and, thus, corrective action is warranted.

Aspects of this disclosure may be implemented, in some embodiments, through a computer-executable program of instructions, such as program modules, generally referred to as software applications or application programs executed by an onboard computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of forming a composite-material construction using a molding system with a mold defining therein a mold cavity, the mold including a primary gate and a primary vent both fluidly connected to the mold cavity, the method comprising:

receiving, via an electronic controller communicatively connected to the molding system, a start signal indicating a fiber-based preform is placed in the mold cavity;

transmitting, via the electronic controller to the molding system, a first command signal to inject a pressurized resin into the mold cavity, via the primary gate, to induce a resin flow rate within the mold cavity and thereby impregnate the fiber-based preform with the resin;

receiving, via the electronic controller from a distributed array of sensors attached to the mold, sensor signals indicative of respective pressure and/or temperature values at discrete locations proximate or on an interior face of the mold cavity;

determining, via the electronic controller, a respective measurement deviation between a calibrated baseline value and the respective pressure and/or temperature value for each of the discrete locations;

responsive to a determination that one of the respective measurement deviations exceeds a calibrated threshold, generating, via the electronic controller, a void signal indicative of a detected void condition, and transmitting a second command signal to open a secondary vent proximate the discrete location corresponding to the pressure and/or temperature value associated with the one of the respective measurement deviations; and transmitting a third command signal to evacuate resin through the primary vent.

2. The method of claim 1, wherein the molding system includes multiple secondary vents fluidly connected to the mold cavity, the method further comprising, responsive to the determination that one of the respective measurement deviations exceeds the calibrated threshold, transmitting the second command signal to open a plurality of the secondary vents.

3. The method of claim 1, further comprising determining permeability fields in a probability model using an inverse analysis.

4. The method of claim 3, wherein determining permeability fields in the probability model includes executing the inverse analysis to determine a probability density of permeability of fibers in the fiber-based preform and a probability density of permeability of race-tracking in gaps between the fiber-based preform and the mold cavity.

5. The method of claim 4, wherein determining the respective measurement deviations further includes determining a reduced model of void indices as a function of the probability density of permeability of the fibers and the probability density of permeability of race-tracking, and wherein the determination that one of the respective measurement deviations exceeds the calibrated threshold includes the void indices exceeding a threshold probability value.

6. The method of claim 5, wherein determining the respective measurement deviations further includes sampling a permeability from a posterior distribution, and evaluating a probability of the void indices using the reduced model.

7. The method of claim 1, further comprising executing a time-based discretization of the sensor signals indicative of respective pressure and/or temperature values, and determining a density function based on the time-based discretization of the sensor signals.

8. The method of claim 7, wherein determining the density function includes determining a joint density function of a vector of void indices discretized over time and a vector of the sensor signals indicative of respective pressure and/or temperature values.

9. The method of claim 8, further comprising determining a probability of pressure and/or temperature values based on a computed density function of sensor values, and determining a conditional probability of the void indices based on the pressure and/or temperature values.

10. The method of claim 9, wherein the determination that one of the respective measurement deviations exceeds the calibrated threshold includes determining:

$$f_{V/P}(v) = f_{V,P}(v,p)/f_P(p)$$

where $f_{V/P}(v)$ is a probability of void indicators conditional on sensor signals indicative of respective pressures at the discrete locations, $f_{V,P}(v,p)$ is the joint density function, and $f_P(p)$ is a marginal density function of the pressures computed by integration.

11. The method of claim 1, further comprising completing a stochastic simulation according to a polynomial chaos expansion (PCE) formalism, and determining time-based PCE coefficients for void indicators and for the discrete locations associated with the distributed array of sensors.

12. The method of claim 11, further comprising determining a time-based sensitivity of the void indicators with respect to the discrete locations associated with the distributed array of sensors.

13. The method of claim 12, further comprising determining a first baseline value with no race-tracking, determining a second baseline value with race-tracking and no voids, and determining a critical tolerable void index.

14. The method of claim 13, wherein the determination that one of the respective measurement deviations exceeds the calibrated threshold includes determining a first difference between sensor signals indicative of respective pressures at the discrete locations and a nominal pressure using the first baseline value, and determining a second difference between sensor signals indicative of respective pressures at the discrete locations and a nominal pressure using the second baseline value.

15. A resin transfer molding system for forming a composite-material construction, the resin transfer molding system comprising:
    a molding apparatus with a mold defining therein a mold cavity, the mold including a primary gate and a primary vent both fluidly connected to the mold cavity;
    a distributed array of sensors attached to the mold and operable to monitor pressure and/or temperature and output signals indicative thereof; and
    an electronic controller communicatively connected to the molding apparatus and the array of sensors, the electronic controller being programmed to:
        receive a start signal indicating a fiber-based preform is in the mold cavity;
        transmit a first command signal to the molding apparatus to inject a pressurized resin into the mold cavity, via the primary gate, to induce a resin flow rate within the mold cavity and thereby impregnate the fiber-based preform with the resin;
        receive, from the distributed array of sensors, sensor signals indicative of respective pressure and/or temperature values at discrete locations proximate or on an interior face of the mold cavity;
        determine a respective measurement deviation between a calibrated baseline value and the respective pressure and/or temperature value for each of the discrete locations; and
        responsive to a determination that one of the respective measurement deviations exceeds a calibrated threshold:
            generate a void signal indicative of a detected void condition, and
            transmit a second command signal to open a secondary vent proximate the discrete location corresponding to the pressure and/or temperature value associated with the one of the respective measurement deviations.

16. The resin transfer molding system of claim 15, wherein the electronic controller is further programmed to execute an inverse analysis to determine a probability density of permeability of fibers in the fiber-based preform and a probability density of permeability of race-tracking in gaps between the fiber-based preform and the mold cavity.

17. The resin transfer molding system of claim 16, wherein the electronic controller is further programmed to determine a reduced model of void indices as a function of the probability density of permeability of the fibers and the probability density of permeability of race-tracking, and wherein the determination that one of the respective measurement deviations exceeds the calibrated threshold includes the void indices exceeding a threshold probability value.

18. The resin transfer molding system of claim 15, wherein the electronic controller is further programmed to execute a time-based discretization of the sensor signals indicative of respective pressure and/or temperature values, and determining a density function based on the time-based discretization of the sensor signals.

19. The resin transfer molding system of claim 18, wherein determining the density function includes determining a joint density function of a vector of void indices discretized over time and a vector of the sensor signals indicative of respective pressure and/or temperature values.

20. The resin transfer molding system of claim 15, wherein the electronic controller is further programmed to complete a stochastic simulation according to a polynomial chaos expansion (PCE) formalism, and determine time-based PCE coefficients for void indicators and for the discrete locations associated with the distributed array of sensors.

* * * * *